(12) United States Patent
Mack et al.

(10) Patent No.: US 11,913,815 B2
(45) Date of Patent: Feb. 27, 2024

(54) METERING CONSOLE

(71) Applicant: HUSQVARNA AB, Huskvarna (SE)

(72) Inventors: Tobias Mack, Ulm (DE); Matthias Müller-Braun, Neu-Ulm (DE); Reinhold Steck, Elchingen (DE)

(73) Assignee: HUSQVARNA AB, Huskvarna (SE)

( * ) Notice: Subject to any disclaimer, the term of this patent is extended or adjusted under 35 U.S.C. 154(b) by 0 days.

(21) Appl. No.: 18/030,826

(22) PCT Filed: Jun. 2, 2021

(86) PCT No.: PCT/EP2021/064761
§ 371 (c)(1),
(2) Date: Apr. 7, 2023

(87) PCT Pub. No.: WO2022/073656
PCT Pub. Date: Apr. 14, 2022

(65) Prior Publication Data
US 2023/0288235 A1   Sep. 14, 2023

(30) Foreign Application Priority Data

Oct. 9, 2020   (EP) ..................... 20200921

(51) Int. Cl.
*G01F 1/12*  (2006.01)
*G01F 1/075*  (2006.01)
*G01F 15/06*  (2022.01)

(52) U.S. Cl.
CPC .............. *G01F 1/125* (2013.01); *G01F 1/075* (2013.01); *G01F 15/068* (2013.01)

(58) Field of Classification Search
CPC ......... G01F 1/125; G01F 1/075; G01F 15/068
See application file for complete search history.

(56) References Cited

U.S. PATENT DOCUMENTS

2003/0233885 A1   12/2003  Bird et al.
2014/0069506 A1*   3/2014  Helmsderfer ......... B05B 15/625
                                                            137/1

(Continued)

FOREIGN PATENT DOCUMENTS

CN    204286516 U    4/2015
CN    204301804 U    4/2015

(Continued)

OTHER PUBLICATIONS

International Search Report and Written Opinion from International Application No. PCT/EP2021/064761 dated Sep. 13, 2021, all pages cited in its entirety.

(Continued)

*Primary Examiner* — Peter J Macchiarolo
*Assistant Examiner* — John M Royston
(74) *Attorney, Agent, or Firm* — Burr & Forman LLP

(57) ABSTRACT

A metering console (100) includes a housing (110) adapted to allow flow of a liquid (F) therethrough. The housing (110) is adapted to attach with one or more gardening devices (132, 152). The metering console (100) includes a display (170) associated with the housing (110). The metering console (100) is characterized in that the display (170) is rotatably engaged with the housing (110) of the metering console (100) such that the display (170) rotates along a central axis (A-A') of the housing (110).

9 Claims, 4 Drawing Sheets

(56) References Cited

U.S. PATENT DOCUMENTS

| | | | | |
|---|---|---|---|---|
| 2015/0336121 | A1* | 11/2015 | Randa | B64F 5/23 239/8 |
| 2018/0216978 | A1* | 8/2018 | Dames | G01F 15/18 |
| 2020/0191626 | A1* | 6/2020 | LaCrosse | G01F 1/50 |
| 2020/0209027 | A1* | 7/2020 | Yamazaki | G01F 1/662 |

FOREIGN PATENT DOCUMENTS

| | | |
|---|---|---|
| CN | 204831442 U | 12/2015 |
| CN | 205175575 U | 4/2016 |
| CN | 105850673 A | 8/2016 |
| CN | 106932046 A | 7/2017 |
| CN | 208140211 A1 | 11/2018 |
| CN | 208818265 U | 5/2019 |
| CN | 210426642 U | 4/2020 |
| CN | 210638759 U | 5/2020 |
| CN | 212620898 U * | 2/2021 |
| DE | 3727912 A1 | 3/1989 |
| EP | 2236998 B1 | 3/2012 |
| EP | 2427275 B1 | 3/2016 |
| FR | 2841093 A1 | 12/2003 |
| JP | 5168944 B2 | 3/2013 |
| WO | 2011055362 A1 | 5/2011 |
| WO | 2012126963 A2 | 9/2012 |

OTHER PUBLICATIONS

International Preliminary Report on Patentability for International Application No. PCT/EP2021/064761 dated Sep. 26, 2022, all pages cited in its entirety.

* cited by examiner

METERING CONSOLE

TECHNICAL FIELD

The present disclosure relates to a metering console. More specifically, the present disclosure relates to a metering console which provides a user-friendly and adjustable display.

BACKGROUND

Metering consoles such as water metering consoles include a display within a housing of the metering consoles. The display allows to indicate parameters related to a liquid flowing through the metering consoles, such as for applications of the metering consoles with different gardening devices. The display of the metering consoles is generally fixed relative to the housing. This may hamper access to the display for users when the metering console is fixed with the gardening devices, at times due to a fixed coupling arrangement between the metering console and the gardening devices. This may lead to constraints regarding observation of proper reading, and indications from the display for the users of the metering consoles.

Moreover, there have been constrains regarding orientation or position of the display with respect to the users of the metering consoles. During application of the metering consoles gardening devices such as spray guns, and sprinklers, there may be chances of improper or missed readings due to improper visual access to the display of the metering consoles. There have been efforts in the past to address such issues. But such efforts fail to fully address both implementation shortcomings and user inconveniences.

FR patent application 2,841,093 discloses an equipment for watering plantations. The equipment includes a connector which is removably coupled to a gun. In some embodiments, the connector includes a display which is mounted with a collar (or a hose clamp) with the connector. Such mounting of the display, by the collar or the hose clamp, may constrain desired rotational movement of the display with respect to the connector. Further, the display of the present reference seems constrained by fixed mounting means i.e., the collar or the hose clamp. Moreover, the present reference seems to provide rotation of the display along (or together) with the connector when assembled with the gun, rather than independent rotation of the display within any housing. Such shortcomings may lead to hindrance and constraints in visual access to the display due to restricted movement or rotation of the display with respect to the connector.

One example of a metering console is disclosed by EP reference 2,236,998 (hereinafter, '998 reference). The '998 reference relates to a consumption meter with a housing with the measuring tube inside, and an ultrasound transducer arranged for measurement of fluid flow in the measuring tube. The meter includes a first unit with a first set of terminals electrically connected to a first circuit board. The meter further includes a second unit with a second circuit board, a display element arranged to display a measured amount, and a second set of terminal connected to the second circuit board. The second set of terminals is arranged for engagement with the first set of terminals at least at two different angular positions relative to each other, such as at four different angular positions in 90° steps. So, the display can be turned for comfortable reading in relation to the measurement circuit, and thus in relation to the housing, irrespective of an actual orientation of the housing in a specific piping installation. However, the '998 reference seems short of providing an ergonomic display which may be adapted as per user needs.

Thus, there is a need of an improved metering console which provides an adjustable display.

SUMMARY

In view of the above, it is an objective of the present invention to solve or at least reduce the drawbacks discussed above. The objective is at least partially achieved by a metering console. The metering console includes a housing adapted to allow a flow of a liquid therethrough. The housing is adapted to attach with one or more gardening devices. The metering console includes a display associated with the housing. The metering console is characterized in that the display is rotatably engaged with the housing of the metering console such that the display rotates along a central axis of the housing. Thus, the present disclosure provides a simple, convenient, and user-friendly display which is rotatable with respect to the housing of the metering console.

According to an embodiment of the present invention, the metering console includes a battery, and a plurality of electronics provided with the display. The battery and the plurality of electronics are rotatably mounted within the metering console. This allows easy and trouble-free rotation of the battery and the electronics, based upon rotation of the display.

According to an embodiment of the present invention, the housing's shape fines an axis along which the liquid flows. If the housing is of cylindrical shape the flow of the liquid is most preferably along the housing's central axis. The display rotates along a plane substantially perpendicular to a direction of the flow of the liquid. The display of the present disclosure is rotatable in the plane generally perpendicular to the central axis of the housing or the flow of the liquid. In an embodiment the shape of the housing may be cylindrical and in a further example the display itself is cylindrical. While a cylindrical shape might be appellant to the user of the metering device, as this shape implies the rotational ability of the display relative to the housing, it is obvious that the housing and/or the display can be of any shape without diverting from the invention.

According to an embodiment of the present invention, the one or more gardening devices includes at least one of a hose connector, and a tap connector. The gardening devices are readily coupled with the metering console without a need of any spacers, adapters, and the like.

According to an embodiment of the present invention, the display, the battery, and the plurality of the electronics are mounted on a rotatable structure which is rotatably engaged with the housing of the metering console. This allows primary components of the display such as the battery, and the plurality of the electronics to turn in unison with rotation of the display with the rotatable structure.

According to an embodiment of the present invention, the display includes at least one display panel. The display of the present disclosure may have any number, type, size, and position of the display panel.

According to an embodiment of the present invention, the metering console is a water metering console. The water metering console is generally used in garden installation to display parameters regarding flow of the water (i.e. the liquid) within the metering console.

According to an embodiment of the present invention, a spray gun includes the metering console of the present disclosure. According to an embodiment of the present invention, a sprinkler includes the metering console of the present disclosure. This allows removable installation of the metering console with different gardening equipments such as the spray gun, the sprinkler, and the like.

Other features and aspects of this invention will be apparent from the following description and the accompanying drawings.

BRIEF DESCRIPTION OF THE DRAWINGS

The invention will be described in more detail with reference to the enclosed drawings, wherein.

DESCRIPTION OF EMBODIMENTS

Figure 1B:
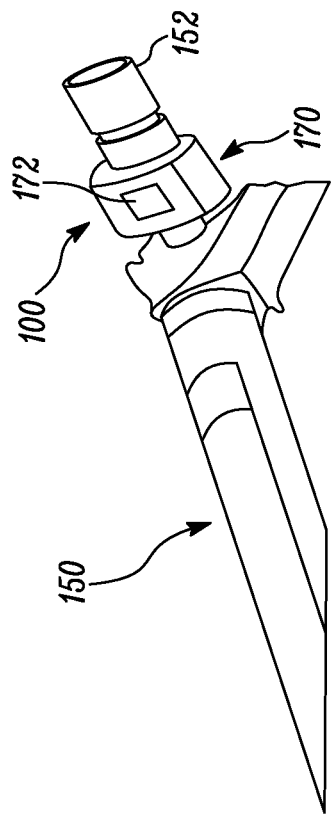
FIGS. 1A, 1B show a perspective views of a spray gun and a sprinkler making application of a metering console, in accordance with an embodiment of the present invention.

The present invention will be described more fully hereinafter with reference to the accompanying drawings, in which example embodiments of the invention incorporating one or more aspects of the present invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. For example, one or more aspects of the present invention can be utilized in other embodiments and even other types of structures and/or methods. In the drawings, like numbers refer to like elements.

Certain terminology is used herein for convenience only and is not to be taken as a limitation on the invention. For example, "upper", "lower", "front", "rear", "side", "longitudinal", "lateral", "transverse", "upwards", "downwards", "forward", "backward", "sideward", "left," "right," "horizontal," "vertical," "upward", "inner", "outer", "inward", "outward", "top", "bottom", "higher", "above", "below", "central", "middle", "intermediate", "between", "end", "adjacent", "proximate", "near", "distal", "remote", "radial", "circumferential", or the like, merely describe the configuration shown in the Figures. Indeed, the components may be oriented in any direction and the terminology, therefore, should be understood as encompassing such variations unless specified otherwise.

In the drawings and specification, there have been disclosed preferred embodiments and examples of the invention and, although specific terms are employed, they are used in a generic and descriptive sense only and not for the purpose of limitation of the scope of the invention being set forth in the following claims.

Figure 1A:
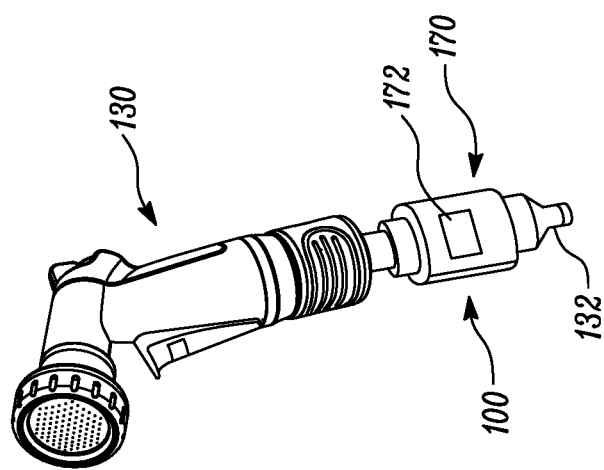

FIGS. 1A, 1B illustrate a metering console 100 assembled with a spray gun 130 and a sprinkler 150, respectively. Further, the metering console 100 may be generally connected to one or more gardening devices which include at least one of a hose connector 132, and a tap connector 152, although other gardening devices have been contemplated and are well within the scope of the present disclosure. The gardening devices are readily coupled with the metering console 100 without a need of any spacers, adapters, and the like. The metering console 100 is shown attached to the spray gun 130 and the sprinkler 150 at one end, while the other end (i.e. with the hose connector 132, and the tap connector 152) can be readily implemented with any indoor/outdoor watering device such as a hose, a tap, and the like for a supply of water.

As illustrated, the metering console 100 includes a display 170. The display 170 includes a display panel 172 to allow display of different parameters related to the metering console 100. The display panel 172 of the display 170 of the metering console 100 may be misaligned with the spray gun 130 and the sprinkler 150. The present disclosure provides the display 170 of the metering console 100 which is readily adjustable and may avoid issues associated with conventional metering consoles (not shown). The conventional metering consoles may lead to issues such as hampered visual access, constraints in recording readings for users due to a fixed display (not shown). Further, such issues may lead to errors and miscalculations in applications of the conventional metering console, due to improper reading from the fixed display of the conventional metering consoles.

Figure 2:
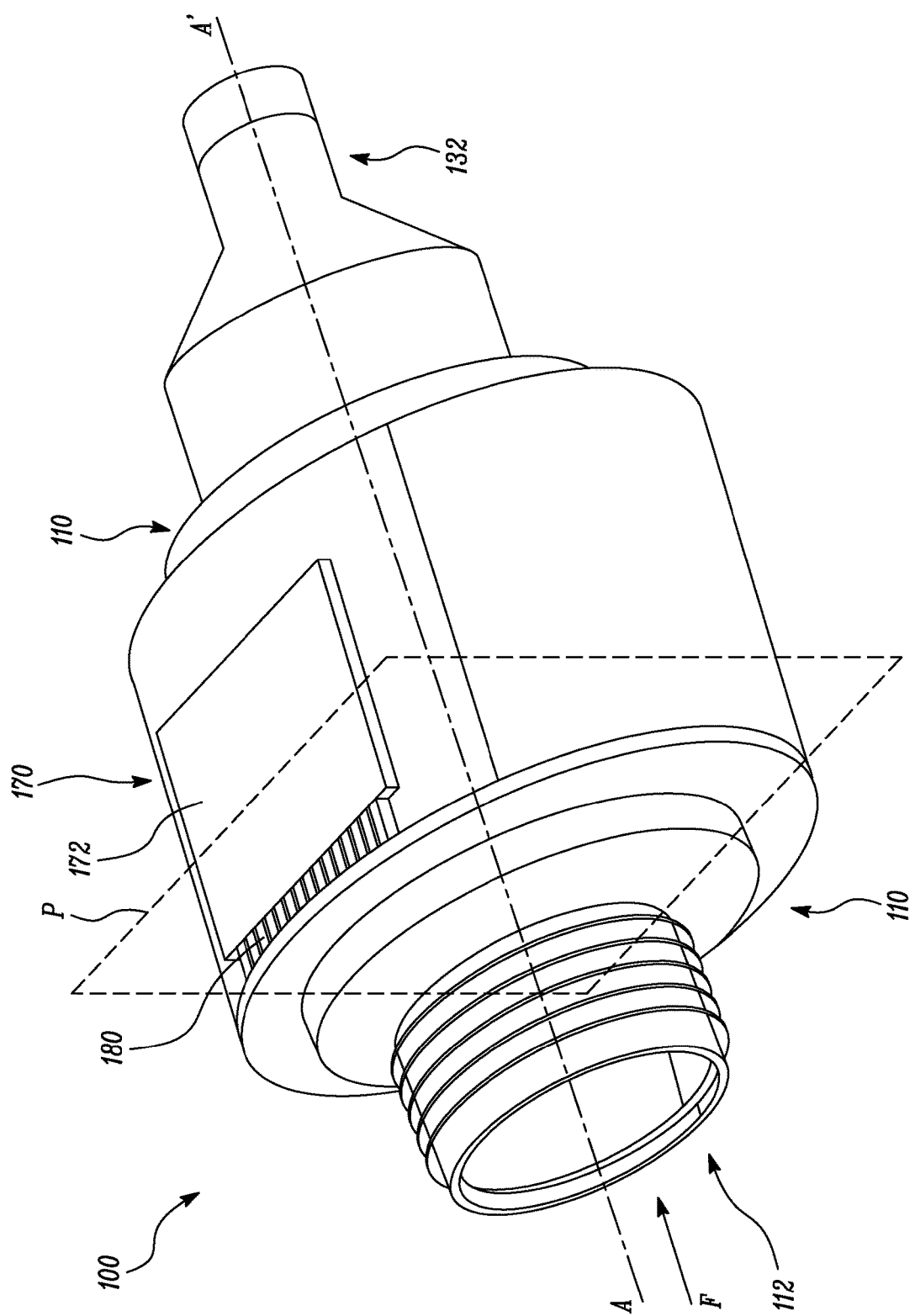
FIG. 2 shows a perspective view of a metering console, in accordance with an embodiment of the present invention.

FIG. 2 illustrates the metering console 100. The metering console 100 includes a housing 110 adapted to allow flow of a liquid F therethrough. The liquid may generally be water or any other liquid having applications with the gardening devices, such as the spray gun 130 and the sprinkler 150 as shown in FIGS. 1A, 1B. More particularly, the housing 110 is adapted to attach with one or more gardening devices (i.e. the spray gun 130 and the sprinkler 150). In some embodiments, the metering console 100, based on arrangement of the housing 110 and the display 170, has a cylindrical shape defining a central axis A-A' along the flow of the liquid F. In a preferred embodiment the display 170 and the housing 110 are coupled together to obtain the cylindrical metering console 100 of the present disclosure. The metering console 100 is such that the display 170 is sandwiched between the housing 110 on both sides. More particularly, the display 170 is rotatably coupled or mounted with the housing 110 on each side thereof. The housing 110 may be made of material selected from one or more of a metal, alloys, rubbers, polymers, or any material as used or known in the art. As illustrated, the metering console 100 has a cylindrical shape. The metering console 100 defines two-ends i.e. an inlet 112 and an outlet (not shown) for inlet and outlet of the fluid. The present disclosure illustrates the hose connector 132 connected at the outlet of the metering console 100. Other shape variations of the metering console 100 are possible and contemplated, however, the present disclosure prefers the cylindrical shape due to aesthetic and ergonomic considerations.

Figure 3:
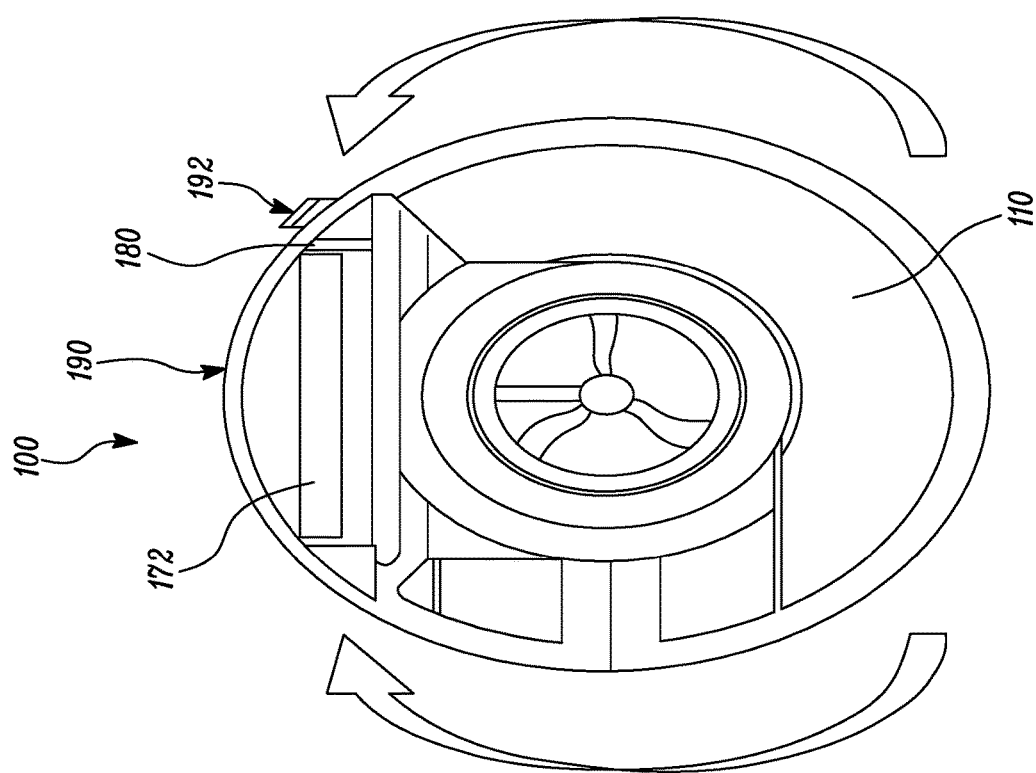
FIG. 3 shows a partial side-sectional view of a metering console, in accordance with an embodiment of the present invention.

The metering console 100 includes the display 170 associated with the housing 110. The display 170 includes the display panel 172. In some embodiments, the display 170 includes at least one display panel 172, however actual implementation may have any type, size, number, position of the display panel 172. In some embodiments, at least some section or whole of the display 170 may work as the display panel 172. The display 170 is rotatably engaged with the housing 110 of the metering console 100 such that the display 170 rotates along the central axis A-A' of the housing 100. As illustrated, the display 170 rotates along a plane "P" (shown in FIGS. 2, 4) substantially perpendicular to a direction of the flow of the liquid F in the housing 110, as illustrated in FIG. 3. The display 170 allows adjustments to different positions with respect to the housing 110 of the metering console 100, to improve alignment of the display panel 172 of the display 170 of the metering console 100 attached with the gardening devices (i.e. the spray gun 130 and the sprinkler 150).

Referring to FIGS. 2, 3, the metering console 100 includes a battery (not shown), and a plurality of electronics 180 provided with the display 170. The battery and the plurality of electronics 180 are electronically connected with the display panel 172 of the display 170. In a preferred embodiment, the battery and the plurality of electronics 180 are rotatably mounted within the metering console 100. This allows easy and trouble-free rotation of the battery and the electronics 180, based upon rotation of the display 170.

The display 170 is mounted with a rotatable structure 190, which is housed within the metering console 100. The rotatable structure 190 may serve as a connecting means between the display 170 and the housing 110. This allows rotation of the display 170 along the plane "P" perpendicular to the central axis A-A'. As illustrated in FIG. 3, the display 170 (and the rotatable structure 190) is free to rotate in clockwise as well as anti-clockwise sense to allow adjustment of the display panel 172 of the display 170. Further, the display 170 (or the rotatable structure 190) may be fixed to different angular positions along the cylindrically-shaped housing 110 of the metering console 100. In some embodiments, the display 170 (or the rotatable structure 190) may be fixed to the different angular positions by a stop (not shown) provided in the metering console 100.

Figure 4:
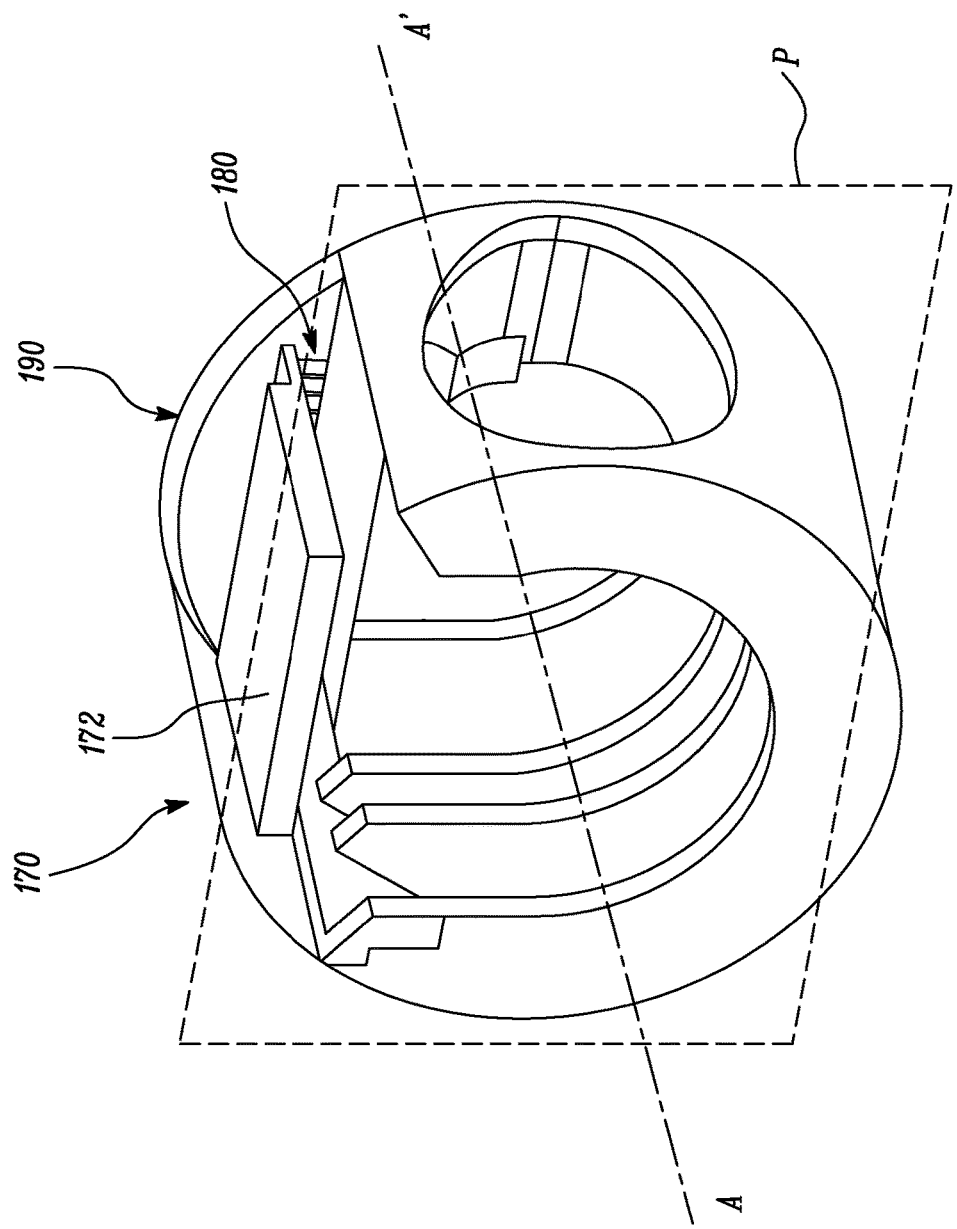
FIG. 4 shows a perspective view of a display along with a rotatable structure of a metering console, in accordance with an embodiment of the present invention.

Referring to FIGS. 3, 4, the display 170, the battery, and the plurality of the electronics 180 are illustrated as mounted on the rotatable structure 190 which is rotatably engaged with the housing 110 of the metering console 100. This allows primary components associated with the display 170 such as the battery, and the plurality of the electronics 180 to turn in unison with rotation of the display 170 with the rotatable structure 190.

The rotatable structure 190 is generally spherically shaped to rotatably mount within the housing 110 of the metering console 100. The rotatable structure 190 may be provided with one or more engaging features 192 to allows users to engage with and rotate the rotatable structure 190 within the housing 110 of the metering console 100. The present disclosure illustrates one engaging feature 192 which is provided as a protrusion, however the engaging features 192 may be of any type, shape, size, and number without any limitations. In some embodiments, the rotatable structure 190 may be made of a material from one or more of a plastic, a metal, a polymer, or any other material suitable with teachings of the present disclosure. In some embodiments, the display 170 may be adjustably mounted with the rotatable structure 190. This will provide a degree of adjustment of the display panel 172 of the display 170 with the rotatable structure 190 itself.

In some embodiments, the metering console 100 is a water metering console 100. The water metering console 100 is generally used in garden installation to display parameters regarding flow of the water (i.e. the liquid F) within the metering console 100.

The present disclosure provides applications of the spray gun 130 which includes the metering console 100 and the sprinkler 150 which includes the metering console 100. This allows removable installation of the metering console 100 having the display 170 with different gardening equipments such as the spray gun 130, and the sprinkler 150. Further, the display 170 of the present disclosure allows rotatable adjustment of the display panel 172 to multiple positions with respect to the housing 110 of the metering console 100.

In the drawings and specification, there have been disclosed preferred embodiments and examples of the invention and, although specific terms are employed, they are used in a generic and descriptive sense only and not for the purpose of limitation of the scope of the invention being set forth in the following claims.

LIST OF ELEMENTS

100 Metering Console
110 Housing
112 Inlet
130 Spray Gun
132 Hose Connector
150 Sprinkler
152 Tap Connector
170 Display
172 Display Panel
180 Electronics
190 Rotatable Structure
192 Engaging Feature
F Flow of liquid
A-A' Central Axis
P Plane

The invention claimed is:

1. A metering console comprising:
a housing adapted to allow flow of a liquid therethrough, wherein the housing is adapted to attach with one or more gardening devices; and
a display associated with the housing such that the display is between the housing on both sides;
wherein the display is rotatably coupled or mounted with the housing on each side thereof, so that the display is rotatably engaged with the housing of the metering console such that the display rotates along a central axis of the housing,
wherein the central axis extends through the display,
wherein the display is free to rotate in clockwise as well as anti-clockwise sense; and
wherein the display is mounted with a rotatable structure, which is housed within the metering console.

2. The metering console of claim 1, wherein the metering console includes a battery, and a plurality of electronics configured with the display, wherein the battery and the plurality of electronics are rotatably mounted within the metering console.

3. The metering console of claim 1, wherein the shape of the housing defines the central axis along the flow of the liquid, and wherein the display rotates along a plane substantially perpendicular to a direction of the flow of the liquid.

4. The metering console of claim 1, wherein the housing is adapted to attach with one or more of a hose connector, and a tap connector.

5. The metering console of claim 2, wherein the display, the battery and the plurality of the electronics are mounted on the rotatable structure which is rotatably engaged with the housing of the metering console.

6. The metering console of claim 1, wherein the display includes at least one display panel, wherein the display allows rotatable adjustment of the display panel to multiple positions with respect to the housing of the metering console.

7. The metering console of claim 1, wherein the metering console is a water metering console.

8. A spray gun comprising the metering console of claim 1.

9. A sprinkler comprising the metering console of claim 1.

* * * * *